United States Patent [19]
Broussard et al.

[11] 3,768,269
[45] Oct. 30, 1973

[54] MITIGATION OF PROPAGATING COLLAPSE FAILURES IN PIPELINES DUE TO EXTERNAL LOAD

[75] Inventors: Douglas E. Broussard; Ray R. Ayers; George E. Walker, Jr., all of Houston, Tex.

[73] Assignee: Shell Oil Company, Houston, Tex.

[22] Filed: Apr. 7, 1972

[21] Appl. No.: 242,002

[52] U.S. Cl................. 61/72.3, 72/150, 138/172, 138/174
[51] Int. Cl................. F16l 1/00, F16l 9/04
[58] Field of Search................. 61/72.1, 72.2, 72.3, 61/72.4, 72.5, 72.6, 72.7; 130/172, 174; 72/150

[56] References Cited
UNITED STATES PATENTS
3,590,878  7/1971  Brown.................. 138/172 X 1,266,831  5/1918  Layne.................. 138/172

FOREIGN PATENTS OR APPLICATIONS
1,101,065  3/1961  Germany.................. 138/172

Primary Examiner—Jacob Shapiro
Attorney—Theodore E. Bieber et al.

[57] ABSTRACT

By increasing the section modulus of an underwater pipeline intermittently and for relatively short distances to a substantially higher level, a barrier is provided preventing propagation of a collapse of the pipe caused by external pressure exerted on the outside diameter of the pipe.

8 Claims, 7 Drawing Figures

PATENTED OCT 30 1973 3,768,269

MITIGATION OF PROPAGATING COLLAPSE FAILURES IN PIPELINES DUE TO EXTERNAL LOAD

BACKGROUND OF THE INVENTION

The present invention relates to a method and apparatus for mitigation of propagating collapse failures in underwater pipelines. Deep water offshore pipelines having high diameter to wall thickness (D/t) ratios can collapse in one section and the collapse can propagate along the pipeline until it either encounters an obstacle such as a valve body or until the water depth is substantially decreased.

Collapse failures in underwater pipelines are also induced by pipe laying operations during construction. Pipe laying apparatus maintains the pipe in tension by gripping means engaging the outside diameter of the pipe and as a result tends to oval pipe having thin walls. By ovaling the pipe the collapse resistance can be reduced by as much as 40 per cent if the pipe is deformed one wall thickness. Such a reduction of the collapse resistance is substantial. A result of this is that heavier walled pipe is used (lower D/t ratios) greatly increasing the cost of the underwater pipeline.

Collapse may also be induced after construction and during operation of the pipeline by damage caused by external forces such as dragging ship anchors, mud slides, water induced movement or other disturbances.

SUMMARY OF THE INVENTION

The present invention advantageously solves the problem of propagating collapse in underwater pipelines by increasing the section modulus of the pipe intermittently and for short distances providing an economical mechanical barrier to stop a collapse that is moving along an underwater pipeline.

A further advantage of the present invention is that the mechanical barriers may be installed at prescribed or desired intervals depending upon the economics of the installation prescribing either the minimum or maximum length to be replaced.

An even further advantage of the present invention are the attractive economic benefits that are derived by not being required to install a continuous heavier or thicker walled pipe that directly increases the cost of such an installation.

DESCRIPTION OF THE DRAWING

The invention will be more fully appreciated with reference to the drawings in which.

DESCRIPTION OF A PREFERRED EMBODIMENT

Figure 1:
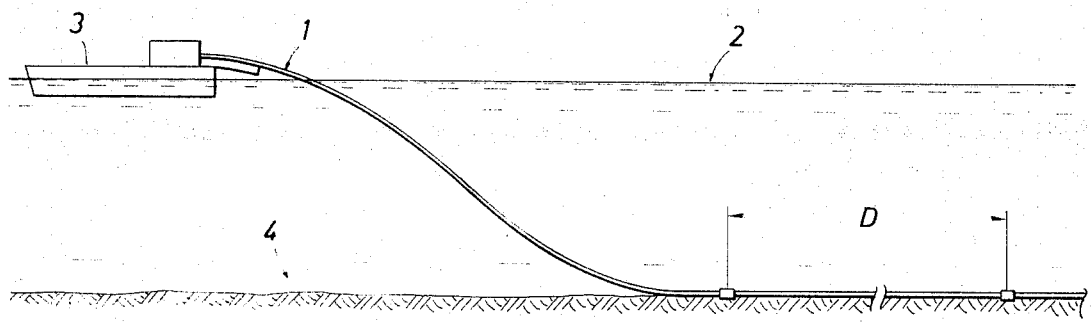
FIG. 1 illustrates an underwater pipeline being installed at an offshore location.

Referring now to FIG. 1, an underwater pipeline 1 is being installed at an offshore location using a pipe laying barge 3 that is equipped with means by which the pipeline 1 is fed into the water 2 such that it assumes a position parallel to and in contact with the sea floor 4. Laying a pipeline having a high D/t ratio and consequent low section modulus (I/c) using a conventional pipe laying barge, can cause a collapse which can propagate along the entire length of a pipeline that may be several miles long. The apparatus on board the barge 3 that maintains the pipeline 1 in tension has a tendency to oval the pipe and as a result lower the collapse resistance of the pipeline 1. By increasing the section modulus of the pipeline at intermittent intervals and for short distances a collapse propagating along the of pipeline 1 can be stopped at the point of increased section modulus.

For a proper understanding of the invention, the basic principles upon which it is founded will first be discussed. Briefly, the basic theory underlying this invention states that by increasing the section modulus of the pipeline 1 over a short interval that a propagating collapse will be blocked. The section modulus is defined by the ratio of the moment of inertia to the distance from the neutral axis to the point of interest. In the case of the circular pipe, the moment of inertia (I) Is described by the following equation:

$$I = \pi/64 \, (D^4 - d^4)$$

Where $D$ = outside diameter of the pipe — inches
$d$ = inside diameter of the pipe — inches It can be seen from an examination of the above equation that as the difference between the outside diameter ($D$) and the inside diameter ($d$) becomes small, that the moment of inertia becomes quite small. Conversely, when this difference becomes large the moment of inertia becomes quite large also. In both of these examples the distance from the neutral axis ($c$) would not vary significantly so that the section modulus ($I/c$) would almost be a direct proportion to the moment of inertia. The distance from the neutral axis ($c$) would not vary because when specifying what size pipe is to be installed reference is made to the outside diameter of the pipe so that thicker walled pipe reduces the internal diameter of the pipe while not changing the outside diameter.

In determining the distance between points of increased section modulus along the underwater pipeline 1 numerous factors need to be considered such as (1) overall length of the pipeline, (2) the diameter to thickness ratio (D/t) of the pipeline, (3) water depth, (4) type of tensioning apparatus on board the barge, (5) minimum length of pipeline that can be feasibly replaced, and (6) cost of installing the increased section modulus means.

Figure 2A:
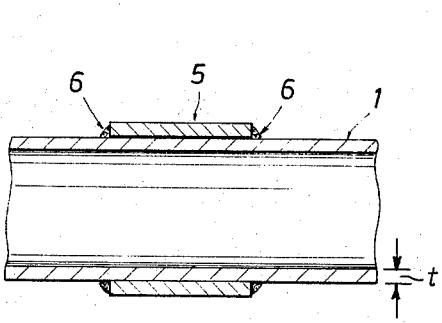
FIG. 2 shows in cross-section one embodiment of the present invention to increase the section modulus of the underwater pipeline.
Figure 2B:
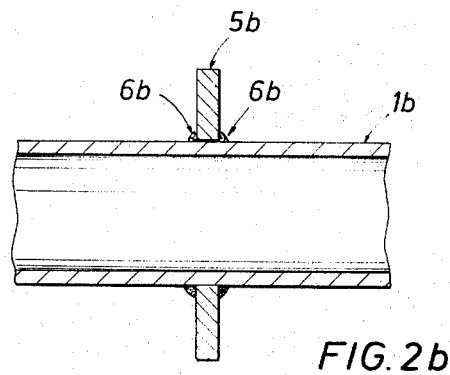
Figure 3:
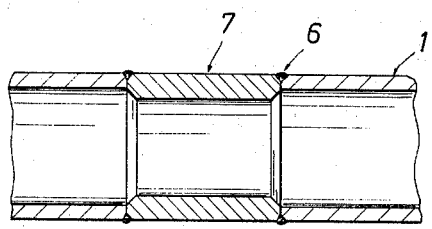
FIG. 3 illustrates an alternate embodiment to increase the section modulus of the underwater pipeline.

In FIG. 2a and 2b one means of increasing the section modulus is shown. A collar 5 can be slipped over the outside of the pipeline 1 and then welded as at weld 6 at both ends to the pipeline 1 to increase the section modulus. This can then be repeated at prescribed intervals as the barge proceeds through the water 2. The outer diameter of the collar may conveniently be selected to be equal to or slightly less than the outer diameter of a concrete weight coating (not shown) that is often applied to large diameter underwater pipelines. In this way, the collapse resisting collars would not interfere with the pipe handling apparatus used during construction. An alternative means to that shown in FIG. 2 is illustrated in FIG. 3. In this figure, a short section of pipe 7 or nipple is installed in the pipeline 1, the pipe 7 having a substantially thicker wall and would be equivalent to that shown in FIG. 2 as a means of increasing the section modulus. The length of the collar 5 and pipe section 7 may be as short as one-half the wall thickness of the pipe or alternatively a minimum section modulus for the collar 5 taken in a plane parallel to the longitudinal axis of the pipeline 1 may be specified. For example, if $I_{min} = 1/12\ bh^3$ where $b$ = the length of the collar 5; and $h = t_{pipe/2}$ and letting $b = 1$ inch $$I_{min} \cong t^3/100$$

therefore the minimum section modulus (S) per inch of collar length is $S_{min}\ (IN^3)/IN = I/c = t^2/25$ where $c = t_{pipe/4}$
illustrating that a short and "stiff" collar 5 will stop collapse propagation better than a long thin collar 5 of equivalent section modulus.

Figure 4:
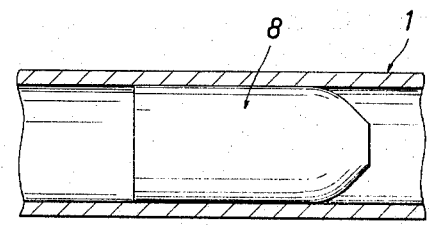
FIG. 4 shows a further embodiment of the present invention.

In FIG. 4 a further embodiment of invention illustrates a metal pig 8 installed in the pipeline 1. The pig 8 would be inserted in pipeline 1 from the barge 3 and displaced to the desired location in the pipeline 1 by using a displacement pump. The operator by knowing the displacement of the pump during each stroke and the volume of the pipeline 1 per unit length can accurately position the pig 8 in the pipeline 1.

Figure 5:
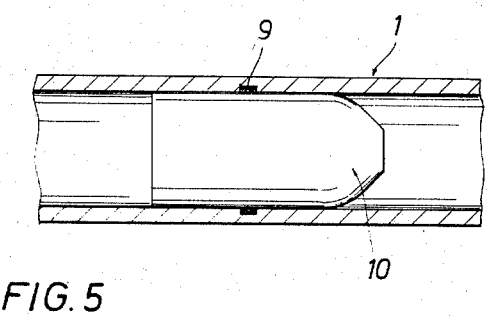
FIG. 5 illustrates another embodiment of the present invention.

A further variation of the invention is shown in FIG. 5 which also utilizes a metal pig 10 as means of stopping a propagating collapse. This embodiment would be preferable to that shown in FIG. 4 as it is installed in prescribed sections of the pipeline 1 prior to assembly. The pig 10 is held in place by an adhesive or magnetic clamp 9 which is designed to shear at predetermined magnitude of pressure differential in the range of 100 psi to 1,000 psi.

Figure 6:
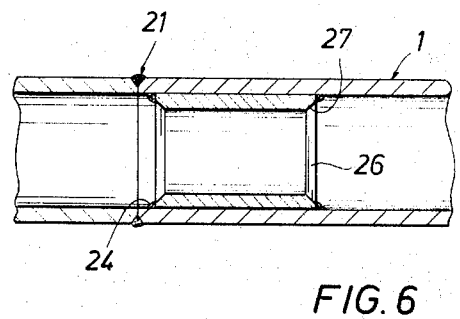
FIG. 6 illustrates another embodiment of the present invention.

An even further embodiment of the present invention is shown in FIG. 6, a short section of pipe 26 is weldably secured to the inside daimeter of the pipeline 1 by means of spot welds 24 at each end. The short section 26 would be installed in the pipeline during the process of laying the pipeline 1 by barge 3 and would be installed at predetermined spaced intervals at the joinder of two separate sections (weld 21) of pipe making up pipeline 1. The short section 26 is preferably provided with chamfers 27 at each end to minimize sharp changes in the internal diameter of the pipeline 1.

The previously described embodiments are particularly intended for application in underwater pipelines having D/t ratios greater than $(C/H)^{1/2}$ where $C = 180,000$ feet; and $H = $ the water depth expressed in feet and are further intended to be applied to protect the pipeline during the construction of pipeline 1. The time during which the pipeline 1 is being installed is the most critical time during which the pipe is subject to abnormal collapse pressures exerted on its outer diameter by the water above it. The pipeline 1 is usually evacuated, having no internal pressure, while being installed and when put into service transporting fluids to an onshore location the pipeline usually has sufficient internal pressure to more than offset any pressure exerted by the head of water above it.

The embodiments of FIGS. 3 and 4 wherein metallic pigs are placed inside the pipeline 1, these pigs would be removed by using a fluid displacement procedure upon completion of the pipeline installation. Pressure would be applied at one end of the pipeline and the pigs would be displaced by fluid until all had reached the opposite end of the pipeline.

The embodiments of the present invention are adaptable for use in any water depth but are particularly useful in water depths where a D/t pipe ratio is desired which exceeds the factor $(C/H)^{1/2}$ where $C = 180,000$ and $H = $ the water depth in feet and preferably the means by which the section modulus is increased are spaced at intervals ranging from 40 feet up to 10 miles from one another.

We claim:

1. A method for preventing a collapse from propagating along an underwater pipeline, said method comprising the step of:

providing means at intermittent intervals along the length of the pipeline to increase the section modulus of the pipeline;

said underwater pipeline having a D/t ratio exceeding the value of the expression $(C/H)^{1/2}$ wherein $D$ is the outside diameter of the pipeline, $t$ is the wall thickness of the pipeline, $C$ is an empirical constant equalling 180,000 feet, and $H$ is the water depth in feet.

2. The method of claim 1 wherein the means comprises a collar having an inside diameter slightly larger than the outside diameter of said pipeline and having a minimum length equal to one-half the wall thickness of the pipeline, the collar being weldably attached to said pipeline.

3. The method of claim 1 wherein the means comprises a section of pipe having a minimum length equal to one-half the wall thickness of the pipeline, and having a greater wall thickness than said pipeline, said pipe section being weldably secured at its ends to said pipeline to form a part of said pipeline.

4. The method of claim 1 wherein the means comprises a metallic pig inserted in the inner bore of said pipeline and having an outside diameter slightly smaller than the inside diameter of said pipeline.

5. The method of claim 4 wherein said pig is displaced to the desired position in said pipeline by pump means.

6. The method of claim 4 wherein said pig is installed in said pipeline and held in place by shearable means.

7. The method of claim 1 wherein the means increasing the section modulus of said pipeline are spaced apart along said pipeline at a distance ranging from 40 feet to 10 miles.

8. The method of claim 1 wherein the means to increase the section modulus has a minimum section modulus (I/c) per inch of length that at least equals the value of the expression $t^2/25$.

* * * * *